US012428896B2

(12) United States Patent
Ku et al.

(10) Patent No.: US 12,428,896 B2
(45) Date of Patent: Sep. 30, 2025

(54) VEHICLE CONTROL APPARATUS AND METHOD THEREOF

(71) Applicants: HYUNDAI MOTOR COMPANY, Seoul (KR); KIA CORPORATION, Seoul (KR)

(72) Inventors: Bon Hyeok Ku, Siheung-si (KR); Chang Seob Park, Seoul (KR); Jae Young Park, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 84 days.

(21) Appl. No.: 18/597,515

(22) Filed: Mar. 6, 2024

(65) Prior Publication Data

US 2025/0116149 A1 Apr. 10, 2025

(30) Foreign Application Priority Data

Oct. 10, 2023 (KR) ........................ 10-2023-0134470

(51) Int. Cl.

*E05F 15/659* (2015.01)
*E05F 15/71* (2015.01)
*E05F 15/79* (2015.01)

(52) U.S. Cl.

CPC ............ *E05F 15/659* (2015.01); *E05F 15/71* (2015.01); *E05F 15/79* (2015.01); *E05Y 2900/546* (2013.01)

(58) Field of Classification Search

CPC ......... E05F 15/659; E05F 15/71; E05F 15/79; E05F 15/611; E05F 15/70; E05F 15/77; E05F 15/42; E05Y 2900/546; E05Y 2400/304; E05Y 2400/32; E05Y 2400/336; E05Y 2400/44; E05Y 2400/446; E05Y 2400/456; E05Y 2400/51; B60R 16/02; G01D 3/08; G01D 5/145

See application file for complete search history.

(56) References Cited

U.S. PATENT DOCUMENTS 11,535,107 B2 * 12/2022 Liu ....................... B60L 3/0092
2013/0151071 A1 * 6/2013 Lee ......................... E05F 15/70

* cited by examiner

*Primary Examiner* — Brodie J Follman
(74) *Attorney, Agent, or Firm* — Lempia Summerfield Katz LLC

(57) ABSTRACT

A vehicle control apparatus includes an input device, a sensor device, a memory, and a controller. The vehicle control apparatus identifies state information of a tailgate of a host vehicle using the sensor device and determines whether a specified condition about loss of the state information is met when a command to open and close the tailgate is received through the input device. The control apparatus also controls opening and closing of the tailgate based on an estimated revolutions per minute (RPM) identified based on at least one of an environmental condition, the training data, an amount of change in current data, an amount of change in RPM, or any combination thereof when it is determined that the specified condition is met.

20 Claims, 8 Drawing Sheets

VEHICLE CONTROL APPARATUS AND METHOD THEREOF

CROSS-REFERENCE TO RELATED APPLICATION

This application claims the benefit of priority to Korean Patent Application No. 10-2023-0134470, filed in the Korean Intellectual Property Office on Oct. 10, 2023, the entire contents of which are incorporated herein by reference.

TECHNICAL FIELD

The present disclosure relates to a vehicle control apparatus and a method thereof, and more particularly, relates to technologies of controlling the opening and closing of a tailgate of a host vehicle.

BACKGROUND

A vehicle may include various doors. For example, a space (e.g., a trunk) that is open to generally load luggage or objects may be provided in the rear of the vehicle. A door (e.g., a tailgate) corresponding to the space may be provided.

A truck was used in the past in a manner in which a person directly opens and closes the tailgate. However, with the development of technology and the evolution of various user needs, automatic opening and closing of the tailgate has become more popular.

As the number of people camping in their vehicles or stopping at specified places to open the tailgates and take a rest is increasing, there is an increasing number of cases where vehicles are used with the tailgates open for a long period of time.

However, there are limits in terms of power consumption for opening and closing the tailgate in the fully automatic scheme. For example, current consumption increases in a state in which the tailgate is open than a state in which the tailgate is closed due to continuously tracking an open state (e.g., an opening angle) of the tailgate or identifying manually changed motion. State information of the tailgate is frequently lost in a state in which the tailgate is open for a long period of time. Furthermore, when a control device for controlling the vehicle is initialized or when the battery of the vehicle is reconnected, the state information of the tailgate may be lost. In this case, because a vehicle control apparatus does not identify the state information of the tailgate and does not know the state information unless a user requests an operation of closing the tailgate in the fully automatic scheme, the vehicle control apparatus does not process an opening and closing operation in the fully automatic scheme.

SUMMARY

The present disclosure has been made to solve the above-mentioned problems occurring in the prior art while advantages achieved by the prior art are maintained.

An aspect of the present disclosure provides a vehicle control apparatus for performing a tailgate opening and closing control function, based in part on identifying state information including a real-time opening and closing state of a tailgate, when receiving an opening and closing command to close the tailgate from a user and for controlling the tailgate to close based on a revolutions per minute (RPM) corresponding to the identified state information.

Another aspect of the present disclosure provides a vehicle control apparatus for controlling opening and closing of a tailgate, based on an estimated RPM identified based on at least one of an environmental condition, training data, an amount of change in current data, an amount of change in RPM, or any combination thereof, when it is identified that state information of the tailgate is lost as a host vehicle meets a specified condition.

Another aspect of the present disclosure provides a vehicle control apparatus for: driving a tailgate during a very short time in the direction of very minutely closing the tailgate using a driving device when it is identified that state information of the tailgate is lost; identifying an amount of change (e.g., an amount of change in current data and an amount of change in RPM) during the time using a hall sensor; and comparing (or matching) the pieces of identified data with training data previously stored in a memory to estimate real-time state information (e.g., opening angle information) of the tailgate.

Another aspect of the present disclosure provides a vehicle control apparatus for closing a tailgate based on an estimated RPM corresponding to estimated state information.

Another aspect of the present disclosure provides a vehicle control apparatus for storing pieces of training data, which are provided differently according to an environmental condition such as a gradient of a road on which the host vehicle resides or a temperature. Another aspect of the present disclosure provides a vehicle control apparatus for: identifying a real-time environmental condition about an environment around a host vehicle using a sensor; identifying a compared result based on specified data corresponding to the identified environmental condition among a plurality of pieces of data included in training data; and calculating an estimated RPM based on the identified compared result.

The technical problems to be solved by the present disclosure are not limited to the aforementioned problems. Any other technical problems not mentioned herein should be more clearly understood from the following description by those of ordinary skill in the art to which the present disclosure pertains.

According to an aspect of the present disclosure, a vehicle control apparatus may include an input device, a sensor device, a memory, and a controller. The memory may store at least one instruction and training data about an RPM and current data according to an opening and closing state of a tailgate. The controller may be operatively connected with the input device, the sensor device, and the memory. For example, the at least one instruction may be configured to, when executed by the controller, cause the vehicle control apparatus to identify state information of the tailgate of a host vehicle using the sensor device. The at least one instruction may also be configured to cause the control apparatus to determine whether a specified condition about loss of the state information is met when a command to open and close the tailgate is received through the input device. The at least one instruction may also be configured to cause the control apparatus to control opening and closing of the tailgate, based on an estimated RPM identified based on at least one of an environmental condition, the training data, an amount of change in current data, an amount of change in RPM, or any combination thereof, when it is determined that the specified condition is met.

According to an embodiment, the at least one instruction may be configured to, when executed by the controller, cause the vehicle control apparatus to determine that the specified condition is met and that the state information is lost when identifying that a battery of the host vehicle is reconnected. The at least one instruction may also be configured to cause the control apparatus to determine that an operation of the controller is initialized or that the tailgate is kept open as a time limit is exceeded.

According to an embodiment, the at least one instruction may be configured to, when executed by the controller, cause the vehicle control apparatus to identify a current opening degree of the tailgate using the state information when it is determined that the specified condition is not met, identify a required RPM required to close the tailgate based on the current opening degree, and close the tailgate based on the required RPM.

According to an embodiment, the at least one instruction may be configured to, when executed by the controller, cause the vehicle control apparatus to identify the state information of the tailgate using a hall sensor included in the sensor device when the command to open and close the tailgate is received.

According to an embodiment, the vehicle control apparatus may further include a tailgate driving device including at least one motor configured to open and close the tailgate. For example, the at least one instruction may be configured to, when executed by the controller, cause the vehicle control apparatus to close the tailgate based on the estimated RPM using the tailgate driving device when it is determined that the specified condition is met.

According to an embodiment, the at least one instruction may be configured to, when executed by the controller, cause the vehicle control apparatus to drive the tailgate during a specified time based on a specified voltage when it is determined that the specified condition is met. The at least one instruction may also be configured to cause the control apparatus to identify the estimated RPM based on a result of comparing the amount of change in current data and the amount of change in RPM during the specified time with the RPM and the current data included in the training data.

According to an embodiment, the at least one instruction may be configured to, when executed by the controller, cause the vehicle control apparatus to estimate real-time opening angle information of the tailgate based on the compared result and close the tailgate based on the estimated RPM corresponding to the real-time opening angle information.

According to an embodiment, the at least one instruction may be configured to, when executed by the controller, cause the vehicle control apparatus to identify the environmental condition about an environment around the host vehicle, using the sensor device. The at least one instruction may also be configured to cause the control apparatus to compare specified data corresponding to the environmental condition among the training data with the amount of change in current data and the amount of change in RPM and identify the compared result.

According to an embodiment, the at least one instruction may be configured to, when executed by the controller, cause the vehicle control apparatus to drive the tailgate in the direction of closing the tailgate during the specified time based on the specified voltage when it is determined that the specified condition is met.

According to an embodiment, the environmental condition may include at least one of temperature information of an area adjacent to the host vehicle, slope information of a road on which the host vehicle is located, or any combination thereof.

According to another aspect of the present disclosure, a vehicle control method may include identifying, by a controller, state information of a tailgate of a host vehicle using a sensor device. The method may also include determining, by the controller, whether a specified condition about loss of the state information is met when a command to open and close the tailgate is received through an input device. The method may also include controlling, by the controller, opening and closing of the tailgate, based on an estimated RPM identified based on at least one of an environmental condition, training data stored in a memory, an amount of change in current data, an amount of change in RPM, or any combination thereof, when it is determined that the specified condition is met.

According to an embodiment, determining whether the specified condition about the loss of the state information is met by the controller, when the command to open and close the tailgate is received through the input device, may include determining, by the controller, that the specified condition is met and that the state information is lost when identifying that a battery of the host vehicle is reconnected, that an operation of the controller is initialized, or that the tailgate is kept open as a time limit is exceeded.

According to an embodiment, the vehicle control method may further include identifying, by the controller, a current opening degree of the tailgate using the state information when it is determined that the specified condition is not met. The method may further include identifying, by the controller, a required RPM required to close the tailgate, based on the current opening degree, and closing, by the controller, the tailgate based on the required RPM.

According to an embodiment, identifying the state information of the tailgate of the host vehicle, by the controller, using the sensor device may include identifying, by the controller, the state information of the tailgate using a hall sensor included in the sensor device when the command to open and close the tailgate is received.

According to an embodiment, the host vehicle may further include a tailgate driving device including at least one motor configured to open and close the tailgate. According to an embodiment, for example, the vehicle control method may further include closing the tailgate based on the estimated RPM using the tailgate driving device when it is determined that the specified condition is met.

According to an embodiment, the vehicle control method may further include driving, by the controller, the tailgate during a specified time based on a specified voltage, when it is determined that the specified condition is met. The method may further include identifying, by the controller, the estimated RPM based on the result of comparing the amount of change in current data and the amount of change in RPM during the specified time with the RPM and the current data included in the training data.

According to an embodiment, the vehicle control method may further include estimating, by the controller, real-time opening angle information of the tailgate based on the compared result and closing, by the controller, the tailgate based on the estimated RPM corresponding to the real-time opening angle information.

According to an embodiment, the vehicle control method may further include identifying, by the controller, the environmental condition about an environment around the host vehicle using the sensor device. The method may further include comparing, by the controller, specified data corresponding to the environmental condition among the training data with the amount of change in current data and the amount of change in RPM and identifying, by the controller, a compared result.

According to an embodiment, the vehicle control method may further include driving the tailgate in the direction of closing the tailgate during the specified time based on the specified voltage when it is determined that the specified condition is met.

According to an embodiment, the environmental condition may include at least one of temperature information of an area adjacent to the host vehicle, slope information of a road on which the host vehicle is located, or any combination thereof.

BRIEF DESCRIPTION OF THE DRAWINGS

The above and other objects, features, and advantages of the present disclosure should be more apparent from the following detailed description taken in conjunction with the accompanying drawings.

Figure 1:
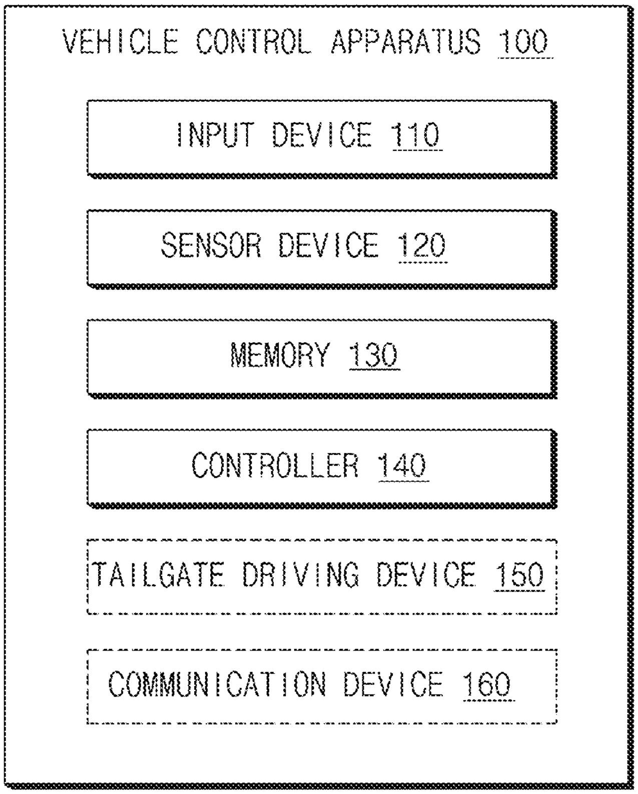
FIG. 1 is a block diagram illustrating components of a vehicle control apparatus according to an embodiment of the present disclosure.

Regarding the description of the drawings, the same or similar denotations may be used for the same or similar components.

DETAILED DESCRIPTION

Hereinafter, some embodiments of the present disclosure are described in detail with reference to the drawings. In adding the reference numerals to the components of each drawing, it should be noted that the identical component is designated by the identical numerals even when they are displayed on other drawings. In addition, a detailed description of well-known features or functions has been omitted in order not to unnecessarily obscure the gist of the present disclosure.

In describing the components of an embodiment according to the present disclosure, terms such as first, second, "A", "B", (a), (b), and the like may be used. These terms are only used to distinguish one element from another element but do not limit the corresponding elements irrespective of the order or priority of the corresponding elements. Furthermore, unless otherwise defined, all terms including technical and scientific terms used herein have the same meaning as being generally understood by those of ordinary skill in the art to which the present disclosure pertains. Such terms as those defined in a generally used dictionary are to be interpreted as having meanings consistent with the contextual meanings in the relevant field of art. Such terms are not to be interpreted as having ideal or excessively formal meanings unless clearly defined as having such in the present application. When a controller, component, device, element, or the like of the present disclosure is described as having a purpose or performing an operation, function, or the like, the controller, component, device, or element should be considered herein as being "configured to" meet that purpose or to perform that operation or function. Each controller, component, device, element, and the like may separately embody or be included with a processor and a memory, such as a non-transitory computer-readable media, as part of the apparatus.

Hereinafter, embodiments of the present disclosure are described in detail with reference to FIGS. 1-7.

FIG. 1 is a block diagram illustrating components of a vehicle control apparatus according to an embodiment of the present disclosure.

According to an embodiment, a vehicle control apparatus 100 may include at least one of an input device 110, a sensor device 120, a memory 130, a controller 140, a tailgate driving device 150, a communication device 160, or any combination thereof. The components of the vehicle control apparatus 100, which are shown in FIG. 1, are illustrative, and embodiments of the present disclosure are not limited thereto. For example, the vehicle control 100 apparatus may further include components (e.g., at least one of an interface, a display, a notification device, or any combination thereof) that are not shown in FIG. 1.

According to an embodiment, the input device 110 may include at least one input device (e.g., a button and/or a touch screen) configured to receive a control command for controlling the opening and closing of a tailgate from a user.

For example, the input device 110 may receive a tailgate opening and closing control input (e.g., a pressure input and/or a touch input) to the at least one input device from the user. For example, when a command to open and close the tailgate for the input device 110 is received, the controller 140 may identify an intention of the user that wants to open or close the tailgate based on a type of the received input and/or a real-time tailgate opening and closing degree (e.g., opening angle information).

For example, the input device 110 may be provided in at least one area in the interior of a host vehicle. The input device 110 may be disposed in one area of at least one of, for example, a center fascia, a steering wheel, a tailgate, a front seat, a rear seat, or any combination thereof.

According to an embodiment, the sensor device 120 may obtain (or identify) various pieces of information about a state of the host vehicle.

For example, the sensor device 120 may include at least one sensor including at least one of a camera, radio detection and ranging (RADAR), light detection and ranging (LiDAR), or any combination thereof.

For example, the sensor device 120 may include at least one sensor (e.g., a hall sensor) configured to obtain information about operation states of the components (e.g., a tailgate) of the host vehicle.

As an example, the sensor device 120 may include at least one hall sensor, which is disposed on one area of the interior (e.g., one area of the tailgate) of the host vehicle to obtain (or identify) state information about an opening angle degree of the tailgate, when the tailgate moves, and/or a movement direction of the tailgate.

For example, the sensor device 120 may include at least one sensor for identifying real-time information (e.g., environmental information) about an environment around the host vehicle.

As an example, the sensor device 120 may include at least one sensor for identifying at least one of temperature information of an area adjacent to the host vehicle, slope information of a road on which the host vehicle is located, or any combination thereof.

According to an embodiment, the memory 130 may store a command or data. For example, the memory 130 may store one or more instructions, when executed by the controller 140, causing the vehicle control apparatus 100 to perform various operations.

For example, the memory 130 and the controller 140 may be implemented as one chipset. The controller 140 may include at least one of a communication processor or a modem.

For example, the memory 130 may store various pieces of information associated with the vehicle control apparatus 100. As an example, the memory 130 may store information about an operation history of the controller 140. As an example, the memory 130 may store information associated with states and/or operations of the components (e.g., at least one of an engine control unit (ECU), the input device 110, the sensor device 120, the controller 140, the tailgate driving device 150, the communication device 160, or any combination thereof) of the host vehicle.

For example, the memory 130 may store training data about a revolutions per minute (RPM) and current data according to an opening and closing state of the tailgate. In other words, the memory 130 may store the training data (e.g., a mapping table) corresponding to the RPM and the current data corresponding to an opening and closing degree (or an opening degree) of the tailgate.

As an example, the training data may include a plurality of datasets divided according to a state of an environmental condition about an environment around the host vehicle (e.g., an ambient temperature of the host vehicle environment or a gradient of the road on which the host vehicle is present).

As an example, the training data may include a mapping table defined as a developer inputs predefined parameters in the stage of developing the vehicle control apparatus 100. At least some of the datasets included in the training data may be changed by settings of a user and/or the developer.

According to an embodiment, the controller 140 may be operatively connected with at least one of the input device 110, the sensor device 120, the memory 130, the tailgate driving device 150, the communication device 160, or any combination thereof. For example, the controller 140 may control an operation of at least one of the input device 110, the sensor device 120, the memory 130, the tailgate driving device 150, the communication device 160, or any combination thereof.

For example, the controller 140 may identify state information of the tailgate of the host vehicle, using the sensor device 120.

As an example, the controller 140 may identify state information of the tailgate of the host vehicle, using the hall sensor included in the sensor device 120. The state information of the tailgate may include, for example, information about at least one of a real-time opening and closing degree (or opening angle information) of the tailgate, whether the tailgate moves, a movement direction of the tailgate, or any combination thereof.

As an example, when a tailgate opening and closing command, which is described below, is received, the controller 140 may then identify state information of the tailgate using the sensor device 120.

For example, when the command to open and close the tailgate is received through the input device 110, the controller 140 may determine whether a specified condition about loss of the state information is met.

As an example, the command to open and close the tailgate may be a control command which is input to close the tailgate in a state in which the tailgate is open. As another example, the command to open and close the tailgate may be a control command which is input to open the tailgate in a state in which the tailgate is closed.

As an example, the loss of the state information may mean that the controller 140 does not identify the state information of the tailgate to lose the state information of the tailgate when at least some of the components of the host vehicle, the components of the vehicle control apparatus 100, and components about the tailgate meet a specified condition.

As an example, when identifying that the battery of the host vehicle is reconnected, that the operation of the controller 140 is initialized, or that the tailgate is kept open as the time limit is exceeded, the controller 140 may determine that the specified condition is met and that the state information is lost.

For example, when it is determined that the specified condition is not met, the controller 140 may perform an operation corresponding to the tailgate opening and closing command received from the user using the tailgate driving device 150 using the state information.

As an example, when it is determined that the specified condition is met, the controller 140 may operate the tailgate driving device 150 based on an estimated RPM identified based on at least one of an environmental condition, training data, an amount of change in current data, an amount of change in RPM, or any combination thereof, thus controlling opening and closing of the tailgate.

As an example, when the specified condition about the loss of the state information is not met, the controller 140 may determine that it is able to use the state information and may identify a current or real-time opening degree of the tailgate using the state information.

As an example, the controller 140 may identify a required RPM required to close the tailgate, based on the identified current opening degree of the tailgate and may operate the tailgate driving device 150 based on the required RPM to close the tailgate.

For example, when receiving the opening and closing command from the user, the controller 140 may identify state information of the tailgate using the hall sensor included in the sensor device 120.

As an example, when it is determined that the specified condition about the loss of the state information is met, the controller 140 may operate the tailgate driving device 150 based on the estimated RPM to close the tailgate.

As an example, when it is determined that the specified condition is met, the controller 140 may drive the tailgate during a specified time based on a specified voltage. The specified voltage may refer to a voltage required to control the tailgate in the direction of closing the tailgate. The specified time may refer to a time from t1 of FIG. 4B to t2 of FIG. 4B, which is described below. For example, the specified time may be, for example, a very short time.

As an example, the controller 140 may identify an estimated RPM based on the result of comparing the amount of change in current data and the amount of change in RPM during the specified time with the RPM and the current data included in the training data. The controller 140 may identify, for example, an estimated RPM corresponding to the amount of change in real-time current data and the amount of change in RPM, using the training data previously stored in the memory 130.

As an example, the controller 140 may estimate real-time opening angle information of the tailgate based on the result of comparing the amount of change in current data and the amount of change in RPM during the specified time with the RPM and the current data included in the training data. In other words, based on the compared result, the controller 140 may identify information about how open the tailgate is currently.

As an example, the controller 140 may identify an environmental condition about an environment around the host vehicle using the sensor device 120. The controller 140 may compare specified data corresponding to the environmental condition among the training data stored in the memory 130 with the amount of change in current data and the amount of change in RPM and may identify the compared result.

As an example, the controller 140 may operate the tailgate driving device 150 based on the estimated RPM corresponding to the real-time opening angle information of the tailgate to close the tailgate.

As an example, the environmental condition may include at least one of temperature information of an area adjacent to the host vehicle, slope information of a road on which the host vehicle is located, or any combination thereof.

According to an embodiment, the tailgate driving device 150 may include at least one motor configured to open and close the tailgate.

For example, the tailgate driving device 150 may be disposed between the tailgate and a specific area of the host vehicle (e.g., one area of the trunk). The controller 140 may operate the tailgate driving device 150 based on a specific RPM to open or close the tailgate.

According to an embodiment, the communication device 160 may include at least one communication bus for data delivery between the components of the vehicle control apparatus 100 and/or communication between the vehicle control apparatus 100 and external devices (e.g., a server).

For example, the communication device 160 may identify an environmental condition about an environment around the host vehicle based on information received from the external devices.

The components of the vehicle control apparatus 100, which are shown in FIG. 1, are illustrative, and embodiments of the present disclosure are not limited thereto. For example, the vehicle control apparatus 100 may further include a notification device (not shown).

According to an embodiment, the notification device may include at least one display device, at least one haptic device, and/or at least one sound output device.

For example, the controller 140 may provide the user with visual, audible, and/or tactile content about at least one of an opening and closing state of the tailgate, whether the tailgate moves, a movement direction of the tailgate, or any combination thereof using the notification device.

Figure 2:
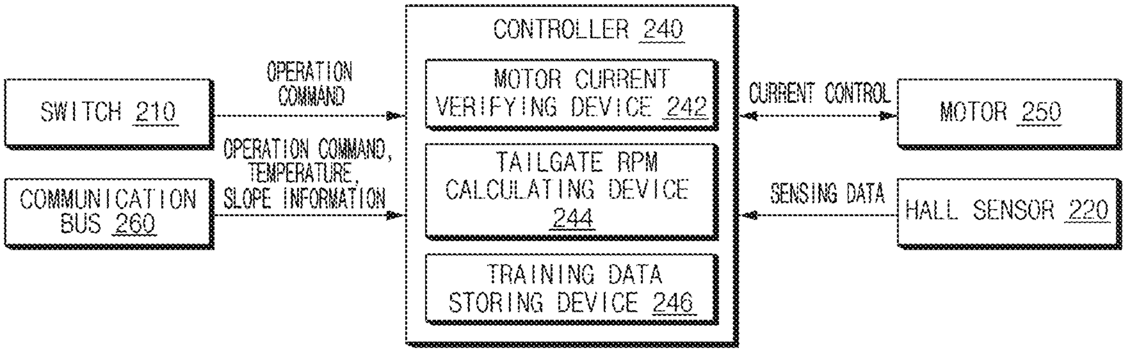
FIG. 2 is a conceptual diagram illustrating components and an operation of a vehicle control apparatus according to an embodiment of the present disclosure.

FIG. 2 is a conceptual diagram illustrating components and an operation of a vehicle control apparatus according to an embodiment of the present disclosure.

According to an embodiment, a vehicle control apparatus (e.g., a vehicle control apparatus 100 of FIG. 1) may include at least one of a switch 210 (e.g., an input device 110 of FIG. 1), a hall sensor 220 (e.g., a sensor device 120 of FIG. 1), a controller 240 (e.g., a controller 140 of FIG. 1), a motor 250 (e.g., a tailgate driving device 150 of FIG. 1), a communication bus 260 (e.g., a communication device 160 of FIG. 1), or any combination thereof. For example, the hall sensor 220 may be one device included in a sensor device (e.g., the sensor device 120 of FIG. 1). For example, the controller 240 may be operatively connected with at least one of the switch 210, the hall sensor 220, the motor 250, or any combination thereof.

The structure of the components shown in FIG. 2 is illustrative, and embodiments of the present disclosure are not limited thereto. For example, the vehicle control apparatus may further include a component (e.g., a notification device) that is not shown in FIG. 2. Furthermore, components (e.g., a motor current verifying device 242, a tailgate RPM calculating device 244, and/or a training data storing device 246) shown as being included in the controller 240 may be implemented as separate devices independent of the controller 240.

For example, the controller 240 may control an operation of at least one of the switch 210, the hall sensor 220, the motor 250, or any combination thereof.

As an example, the controller 240 may receive an operation command from the switch 210. The operation command may be a tailgate opening and closing command corresponding to a user input (e.g., a pressure input and/or a touch input) received from a user. The tailgate opening and closing command may include a control command generated to control the tailgate to open and close.

For example, the controller 240 may receive an operation command, and/or slope temperature information, information from the communication bus 260.

As an example, the controller 240 may directly receive an operation command from the switch 210 and may receive an operation command through the communication bus 260.

As an example, the controller 240 may receive an environmental condition (e.g., temperature information and/or slope information) about an environment around the host vehicle from the communication bus 260. The communication bus 260 may deliver information about the environmental condition delivered from another component (e.g., a sensor) mounted on an external device (e.g., a server) and/or the host vehicle to the controller 240.

For example, the controller 240 may include the motor current verifying device 242, the tailgate RPM calculating device 244, and/or the training data storing device 246. Each of these devices may be part of a vehicle processor or may separately include a processor and a memory.

As an example, the controller 240 may verify a current applied to the motor 250 provided to control opening and closing of the tailgate in real-time, using the motor current verifying device 242.

As an example, the controller 240 may calculate (or verify) an RPM while the tailgate moves in real-time, using the tailgate RPM calculating device 244. As an example, the controller 240 may calculate an estimated RPM corresponding to state information (e.g., opening angle information) of the tailgate, using the tailgate RPM calculating device 244. The estimated RPM may refer to an RPM required to close the tailgate depending on a degree to which the tailgate is open.

As an example, the controller 240 may estimate real-time opening angle information of the tailgate using the training data stored in the training data storing device 246. The controller 240 may also calculate an estimated RPM corresponding to the estimated real-time opening angle information using the tailgate RPM calculating device 244.

For example, the controller 240 may receive (or obtain) sensing data by means of the hall sensor 220.

As an example, when a command to operate (or open and close) the tailgate is received from the switch 210, the controller 240 may identify state information of the tailgate using the hall sensor 220.

As an example, when identifying that the battery of the host vehicle is reconnected, that the operation of the controller 240 is initialized, or that the tailgate is kept open as the time limit is exceeded, the controller 240 may determine that the specified condition is met and that the state information is lost. In other words, when identifying the above-mentioned case, the controller 240 may determine that the current situation of the tailgate is a situation in which the open state is not accurately identified.

Thus, the controller 240 may determine that it is difficult to perform the operation of identifying the real-time state information of the tailgate, may minutely drive the tailgate during a specified time based on a specified voltage in the direction of closing the tailgate using the motor 250, and may identify an amount of change in current data and an amount of change in RPM using the hall sensor 220 while the tailgate is driven.

Thereafter, the controller 240 may identify an estimated RPM based on the result of comparing the amount of change in current data and the amount of change in RPM during the specified time with the RPM and the current data included in the training data.

The controller 240 may operate, for example, the motor 250 based on the estimated RPM to close the tailgate.

Figure 3:
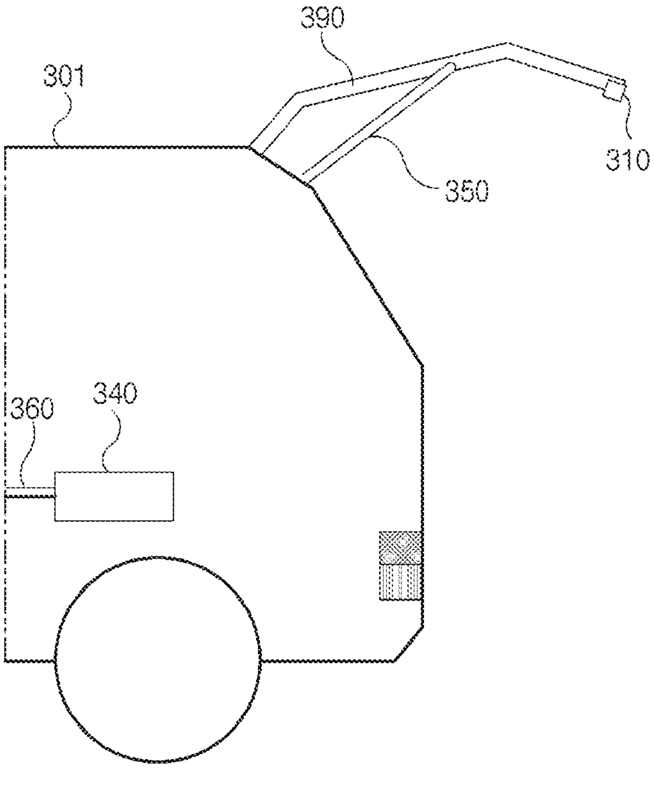
FIG. 3 is a conceptual diagram of a host vehicle and a tailgate according to an embodiment of the present disclosure.

FIG. 3 is a conceptual diagram of a host vehicle and a tailgate according to an embodiment of the present disclosure.

According to an embodiment, a vehicle control apparatus (e.g., a vehicle control apparatus 100 of FIG. 1) may control opening and closing of a tailgate 390 which covers the rear of a host vehicle 301.

For example, the vehicle control apparatus may include at least one of an input device 310 (e.g., an input device 110 of FIG. 1), a controller 340 (e.g., a controller 140 of FIG. 1), a driving device 350 (e.g., a tailgate driving device 150 of FIG. 1) for opening and closing the tailgate 390, a communication device 360 (e.g., a communication device 160 of FIG. 1), or any combination thereof.

Although not illustrated in FIG. 3, the vehicle control apparatus may further include a sensor device (e.g., a sensor device 120 of FIG. 1) configured to identify state information of the tailgate 390 (e.g., at least one of an opening and closing degree of the tailgate 390, whether the tailgate 390 moves, a movement direction of the tailgate 390, or any combination thereof).

For example, the vehicle control apparatus may receive a tailgate opening and closing command corresponding to a user input (e.g., a pressure input and/or a touch input) from a user through the input device 310.

For example, when receiving a user input through the input device 310 in a state in which the tailgate 390 is open as shown in FIG. 3, the vehicle control apparatus may identify the tailgate opening and closing command corresponding to the user input as an operation command to close the tailgate 390.

For example, when the command to open and close the tailgate 390 is received, the vehicle control apparatus may determine whether a specified condition about the loss of the state information is met. When it is determined that the specified condition is met, the vehicle control apparatus may close the tailgate 390 using the driving device 350 based on an estimated RPM identified based on at least one of an environmental condition, training data, an amount of change in current data, an amount of change in RPM, or any combination thereof.

Figure 4A:
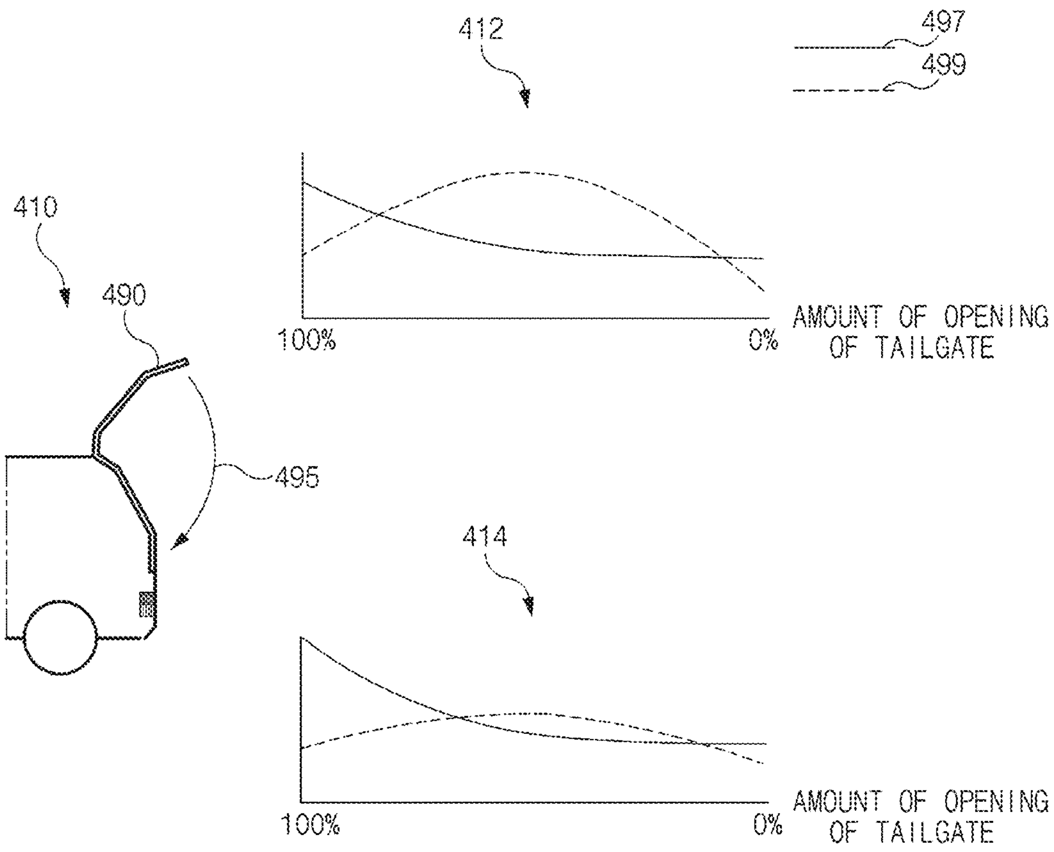
FIG. 4A is an operational conceptual diagram of a vehicle control method according to an embodiment of the present disclosure.
Figure 4B:
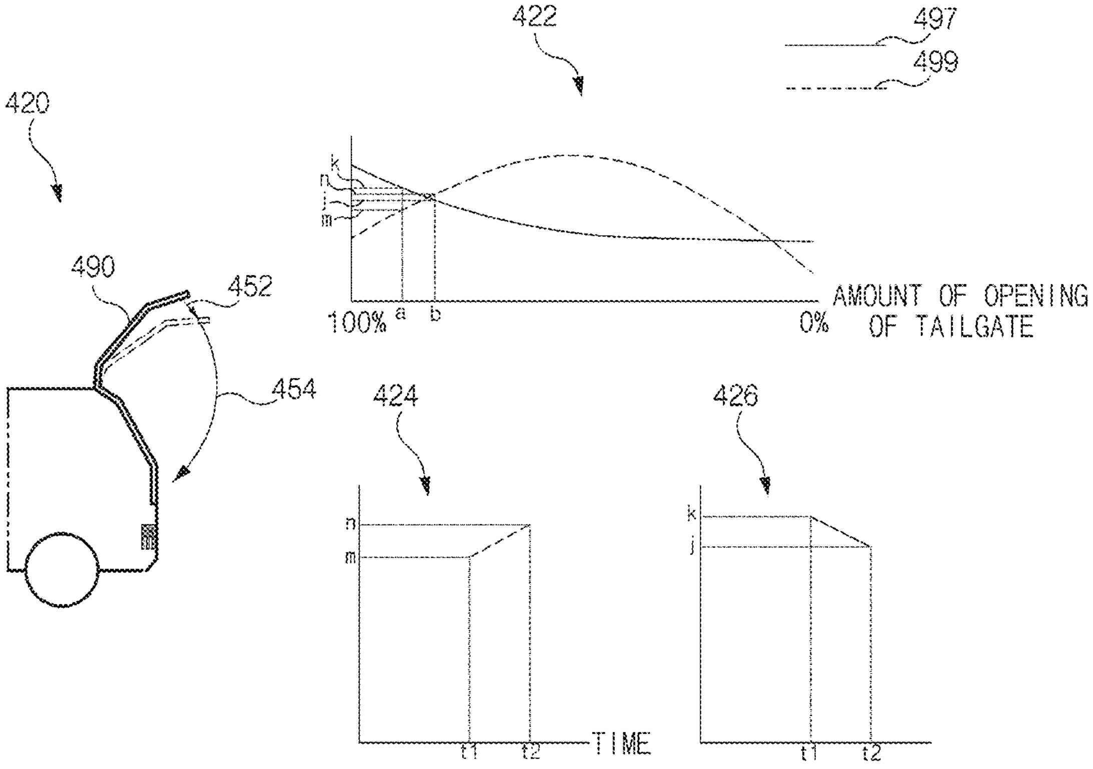
FIG. 4B is an operational conceptual diagram of a vehicle control method according to an embodiment of the present disclosure.

FIGS. 4A and 4B are operational conceptual diagrams of a vehicle control method according to an embodiment of the present disclosure.

Referring to reference numeral 410, according to an embodiment, a vehicle control apparatus (e.g., a vehicle control apparatus 100 of FIG. 1) may store various parameters in a process of closing a tailgate 490 in a first direction 495 in a state in which the tailgate 490 is open in a memory (e.g., a memory 130 of FIG. 1).

Referring to reference numeral 412, according to an embodiment, when the gradient is 0 degrees in a situation where there is a host vehicle in a room temperature environment (e.g., 20 degrees), the vehicle control apparatus may identify a first curve and a second curve. The first curve 497 may correspond to a current from a time point when the tailgate 490 is open at 100% (or a time point when the amount of opening of the tailgate 490 is 100%) and to a time point when the tailgate 490 is open at 0% (or a time point when the amount of opening of the tailgate 490 is 0%) (or a time point when the tailgate 490 is completely closed). The second curve 499 may correspond to an RPM.

Referring to reference numeral 414, according to an embodiment, when the gradient is 20 degrees in the situation where there is the host vehicle in the room temperature (e.g., 20 degrees), the vehicle control apparatus may identify the first curve and the second curve. The first curve 497 may correspond to the current from the time point when the tailgate 490 is open at 100% (or the time point when the amount of opening of the tailgate 490 is 100%) to the time point when the tailgate 490 is open at 0% (or the time point when the amount of opening of the tailgate 490 is 0%) (or the time point when the tailgate 490 is completely closed). The second curve 499 may correspond to the RPM.

The vehicle control apparatus may store training data including data according to reference numeral 412 and reference numeral 414 in the memory. In other words, training data including information about an RPM and a current, which vary with the amount of opening of the tailgate 490 in response to each of temperature information and/or slope information may be previously stored in the memory.

According to an embodiment, when a specified condition about the loss of state information of the tailgate 490 is met, the vehicle control apparatus may close the tailgate 490 using pieces of data and operation concepts according to FIG. 4B.

For example, when identifying that the battery of the host vehicle is reconnected, that the operation of the controller is initialized, or that the tailgate 490 is kept open as the time limit is exceeded, the vehicle control apparatus may determine that the specified condition is met and that the state information is lost. In other words, when the above-mentioned conditions are met, because real-time opening angle information of the tailgate 490 required to control opening and closing is lost, the vehicle control apparatus may identify that the tailgate 490 is not immediately closed.

Thus, the vehicle control apparatus may drive the tailgate 490 during a specified time by a first angle 452 based on a specified voltage. In other words, the vehicle control apparatus may close the tailgate 490 by the first angle 452 during a very short time based on the specified voltage.

Referring to reference numerals 424 and 426, according to an embodiment, the specified time may be a time from a first time point t1 to a second time point t2.

For example, while driving the tailgate 490 by the first angle 452, the vehicle control apparatus may identify the first curve 497 corresponding to the current according to reference numeral 424 and the second curve 499 corresponding to the RPM according to reference numeral 426 using a sensor device (e.g., a sensor device 120 of FIG. 1).

In other words, the vehicle control apparatus may identify information according to reference numeral 424 indicating an amount of change in current from the first time point t1 for temporarily driving the tailgate 490 to the second time point t2 and information according to reference numeral 426 indicating an amount of change in RPM.

For example, according to reference numeral 424, the vehicle control apparatus may identify that the magnitude of an RPM generated (or required) when driving the tailgate 490 at the first time point t1 is m and that the magnitude of an RPM generated when driving the tailgate 490 at the second time point t2 is n.

For example, according to reference numeral 426, the vehicle control apparatus may identify that the magnitude of a current generated (or required) when driving the tailgate 490 at the first time point t1 is k and that the magnitude of a current generated when driving the tailgate 490 at the second time point t2 is j.

For example, the vehicle control apparatus may compare magnitudes of the current and the RPM at each of the first time point t1 and the second time point t2 (or the amount of change in current data and the amount of change in RPM from the first time point t1 to the second time point t2) with training data according to reference numeral 422. The vehicle control apparatus may identify whether a real-time opening degree of the tailgate is some degree based on the compared result. The present embodiment may be defined as an embodiment in which the host vehicle is identified as being present on a road, a gradient of which is 0 degrees in a room-temperature environment. Thus, the vehicle control apparatus may identify the compared result using a graph according to reference numeral 422, which is a graph when the gradient in the room-temperature environment is "0" among a plurality of datasets included in the training data.

For example, the vehicle control apparatus may estimate (or identify) that the opening degree of the tailgate is a % initially at the first time point t1 and that the opening degree of the tailgate is b % at the second time point t2 (or a current time point), based on the compared result.

Thereafter, the vehicle control apparatus may calculate an estimated RPM corresponding to opening angle information (or the opening degree) of the tailgate and may drive a tailgate driving device (e.g., a tailgate driving device 150 of FIG. 1) based on the calculated estimated RPM, thus closing the tailgate in a second direction 454.

Figure 5:
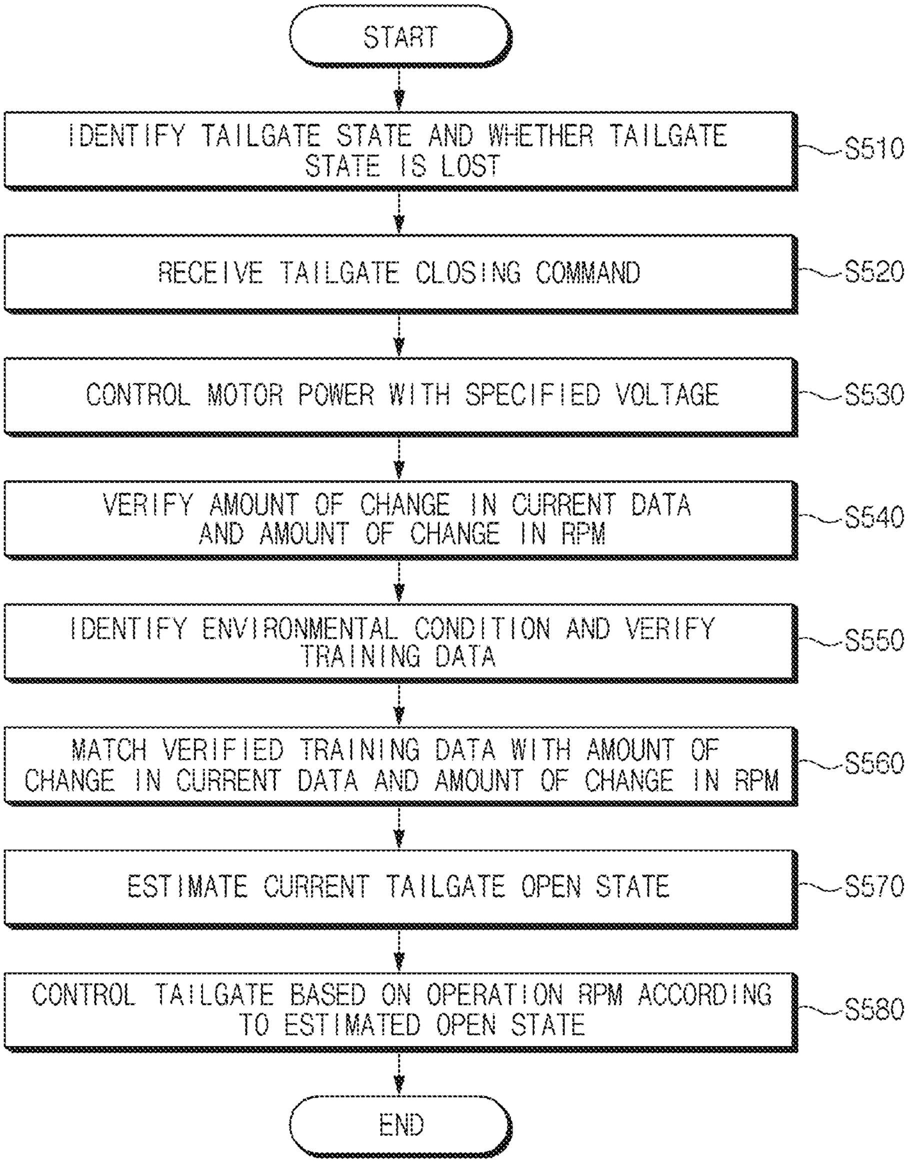
FIG. 5 is a flowchart of a vehicle control method according to an embodiment of the present disclosure.

FIG. 5 is a flowchart of a vehicle control method according to an embodiment of the present disclosure.

According to an embodiment, a vehicle control apparatus (e.g., a vehicle control apparatus 100 of FIG. 1) may perform operations disclosed in FIG. 5. For example, at least some of the components (e.g., an input device 110 of FIG. 1, a sensor device 120 of FIG. 1, a memory 130 of FIG. 1, a controller 140 of FIG. 1, a tailgate driving device 150 of FIG. 1, a communication device 160 of FIG. 1, or any combination thereof) included in the vehicle control apparatus may be configured to perform the operations of FIG. 5.

Operations S510 to S580 in an embodiment below may be sequentially performed but are not necessarily sequentially performed. For example, an order of the respective operations may be changed, and at least two operations may be performed in parallel. Furthermore, contents, which correspond to or are duplicated with the contents described above in conjunction with FIG. 5, may be briefly described or omitted.

According to an embodiment, in operation S510, the vehicle control apparatus may identify a tailgate state and whether the tailgate state is lost.

For example, the vehicle control apparatus may identify state information of a tailgate of a host vehicle (e.g., an opening degree of the tailgate, whether the tailgate moves, or a movement direction of the tailgate), using a sensor device.

For example, the vehicle control apparatus may determine whether a specified condition about loss of the state information is met. In an embodiment according to FIG. 5, the following operations may be defined on the assumption that the specified condition about the loss of the state information is met.

According to an embodiment, in operation S520, the vehicle control apparatus m tailgate closing command.

For example, the vehicle control apparatus may receive a tailgate closing command (or a command to open and close the tailgate) corresponding to a user input received from a user through an input device.

According to an embodiment, in operation S530, the vehicle control apparatus may control motor power with a specified voltage.

For example, the vehicle control apparatus may control motor power during a specified time with the specified voltage, thus closing the tailgate minutely (e.g., by a first angle 452 of FIG. 4B).

According to an embodiment, in operation S540, the vehicle control apparatus may verify an amount of change in current data and an amount of change in RPM.

For example, the vehicle control apparatus may continuously identify current data and an RPM, which are generated while minutely closing the tailgate, during a specified time and may identify an amount of change during the time.

According to an embodiment, in operation S550, the vehicle control apparatus may identify an environmental condition and may verify training data.

For example, the vehicle control apparatus may identify an environmental condition (e.g., temperature information and/or slope information) about an environment around the host vehicle using a sensor device and/or a communication device.

For example, the vehicle control apparatus may verify (or identify) training data corresponding to the identified environmental condition among a plurality of datasets included in the training data.

According to an embodiment, in operation S560, the vehicle control apparatus may match the verified (or identified) training data with the amount of change in current data and the amount of change in RPM.

For example, the vehicle control apparatus may compare (or match) the amount of change in current data and the amount of change in RPM, which are verified in operation S540, with the training data verified in operation S550.

According to an embodiment, in operation S570, the vehicle control apparatus may estimate a current tailgate open state.

For example, the vehicle control apparatus may estimate real-time opening angle information of the tailgate based on the compared result according to operation S560. In other words, apparatus may estimate how open the vehicle control tailgate is currently, based on the compared result.

According to an embodiment, in operation S580, the vehicle control apparatus may control the driving of the tailgate based on an operation RPM (or an estimated RPM) according to the estimated open state.

For example, the vehicle control apparatus may operate the tailgate driving device based on the estimated RPM corresponding to the opening angle information, thus completely closing the tailgate.

Figure 6:
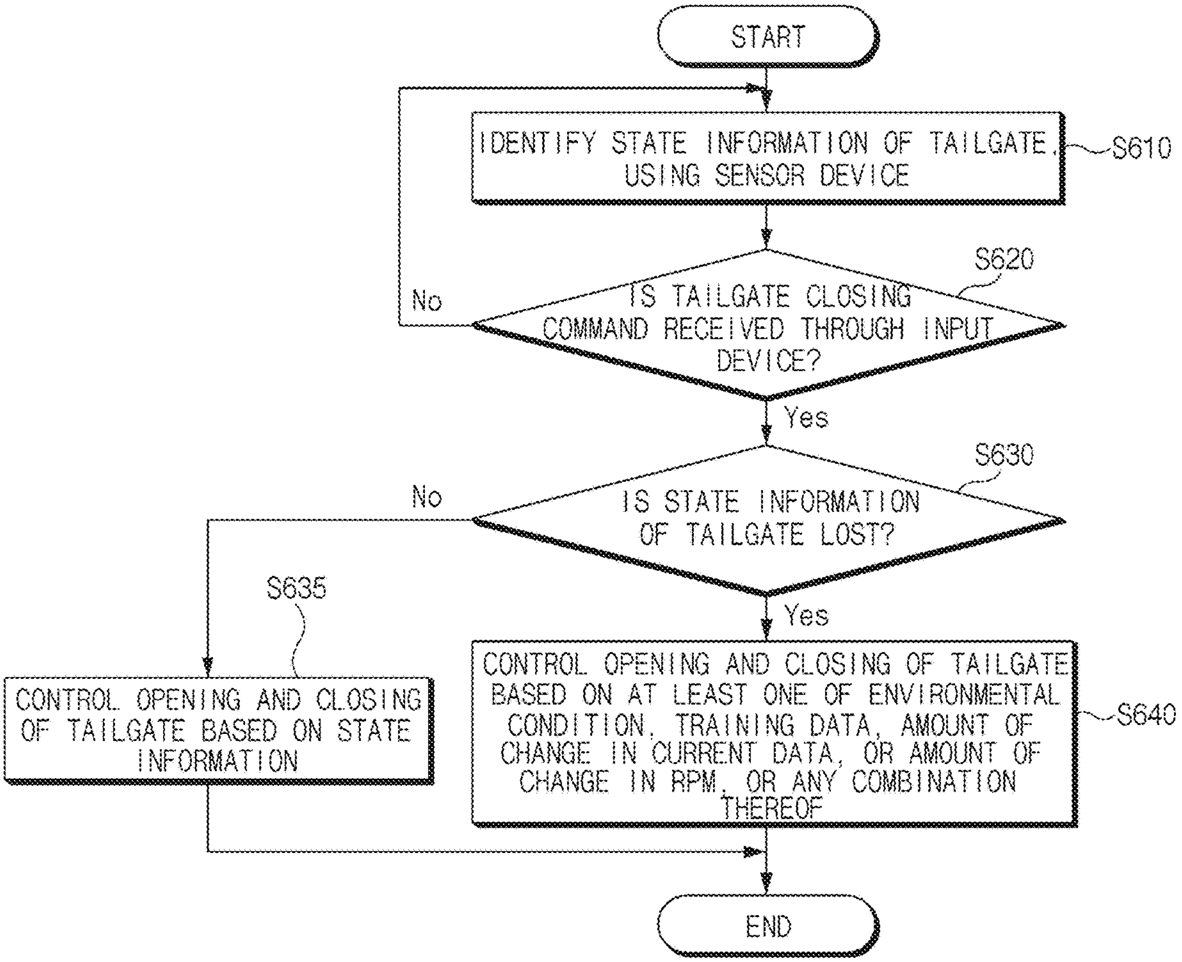
FIG. 6 is a flowchart of a vehicle control method according to an embodiment of the present disclosure.

FIG. 6 is a flowchart of a vehicle control method according to an embodiment of the present disclosure.

According to an embodiment, a vehicle control apparatus (e.g., a vehicle control apparatus 100 of FIG. 1) may perform operations disclosed in FIG. 6. For example, at least some of the components (e.g., an input device 110 of FIG. 1, a sensor device 120 of FIG. 1, a memory 130 of FIG. 1, a controller 140 of FIG. 1, a tailgate driving device 150 of FIG. 1, a communication device 160 of FIG. 1, or any combination thereof) included in the vehicle control apparatus may be configured to perform the operations of FIG. 6.

Operations S610 to S640 in an embodiment below may be sequentially performed but are not necessarily sequentially performed. For example, the order of the respective operations may be changed, and at least two operations may be performed in parallel. Furthermore, contents, that correspond to or are duplicated with the contents described above in conjunction with FIG. 6, may be briefly described or omitted.

According to an embodiment, in operation S610, the driving control apparatus may identify state information of a tailgate, using a sensor device.

According to an embodiment, in operation S620, the vehicle control apparatus may receive a tailgate closing command through an input device.

For example, when the tailgate closing command is received (e.g., S620—Yes), the vehicle control apparatus may perform operation S630.

For example, when the tailgate closing command is not received (e.g., S620—No), the vehicle control apparatus may perform operation S610.

According to an embodiment, in operation S630, the vehicle control apparatus may determine whether the state information of the tailgate is lost.

For example, when identifying that the battery of the host vehicle is reconnected, that the operation of the controller is initialized, or that the tailgate is kept open as the time limit is exceeded, the vehicle control apparatus may determine that a specified condition is met and that the state information is lost.

For example, when it is determined that the state information is lost (e.g., S630—Yes), the vehicle control apparatus may perform operation S640.

For example, when it is determined that the state information is not lost (e.g., S630—No), the vehicle control apparatus may perform operation S635.

According to an embodiment, in operation S640, the vehicle control apparatus may control the opening and closing of the tailgate based on at least one of an environmental condition, training data, an amount of change in current data, an amount of change in RPM, or any combination thereof.

According to an embodiment, in operation S635, the vehicle control apparatus may control opening and closing of the tailgate based on the state information.

Figure 7:
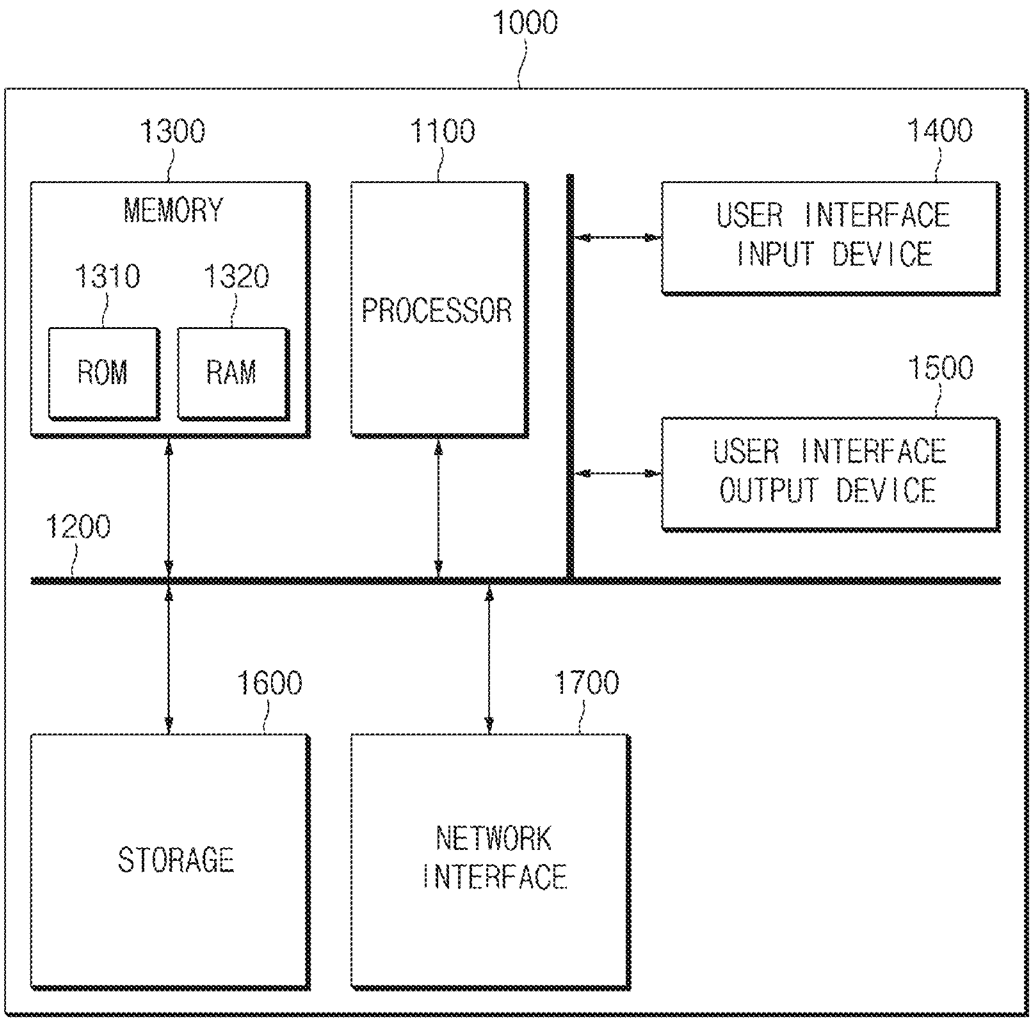
FIG. 7 illustrates a computing system for a vehicle control method according to an embodiment of the present disclosure.

FIG. 7 illustrates a computing system about a vehicle control method according to an embodiment of the present disclosure.

Referring to FIG. 7, a computing system 1000 about the vehicle control method may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read-only memory (ROM) 1310 and a random-access memory (RAM) 1320.

Accordingly, the operations of the method or algorithm described in connection with the embodiments disclosed in the specification may be directly implemented with a hardware module, a software module, or a combination thereof, which is executed by the processor 1100. The software module may reside on a storage medium (i.e., the memory 1300 and/or the storage 1600) such as a RAM, a flash memory, a ROM, an EPROM, an EEPROM, a register, a hard disc, a removable disk, and a CD-ROM.

The storage medium may be coupled to the processor 1100. The processor 1100 may read out information from the storage medium and may write information in the storage medium. Alternatively, the storage medium may be integrated with the processor 1100. The processor and the storage medium may reside in an application-specific integrated circuit (ASIC). The ASIC may reside within a user terminal. In another case, the processor and the storage medium may reside in the user terminal as separate components.

A description is given of effects of the vehicle control apparatus and the method thereof according to an embodiment of the present disclosure.

According to at least one of embodiments of the present disclosure, the vehicle control apparatus may provide a function of minutely driving a tailgate during a short period of time, even in a situation in which state information about the tailgate is lost as a specific situation occurs to identify a real-time opening degree of the tailgate and closing the tailgate in a fully automatic scheme based on an operation parameter (e.g., an RPM) corresponding to the identified result.

Furthermore, according to at least one of embodiments of the present disclosure, the vehicle control apparatus may quickly identify information about a real-time opening and closing degree of the tailgate with only minimum power consumption in a situation in which the tailgate is open and may provide an efficient tailgate opening and closing control function based on it.

In addition, various effects ascertained directly or indirectly through the present disclosure may be provided.

Hereinabove, although the present disclosure has been described with reference to various embodiments and the accompanying drawings, the present disclosure is not limited thereto. but the embodiments of the present disclosure may be variously modified and altered by those of ordinary skill in the art to which the present disclosure pertains without departing from the spirit and scope of the present disclosure claimed in the following claims.

Therefore, embodiments of the present disclosure are not intended to limit the technical spirit of the present disclosure but are provided only for illustrative purposes. The scope of the present disclosure should be construed based on the accompanying claims, and all the technical ideas within the scope equivalent to the claims should be included in the scope of the present disclosure.

What is claimed is:

1. A vehicle control apparatus, comprising:

an input device;

a sensor device;

a memory storing at least one instruction and training data about a revolutions per minute (RPM) and current data according to an opening and closing state of a tailgate of a host vehicle; and a controller operatively connected with the input device, the sensor device, and the memory, wherein the at least one instruction is configured to, when executed by the controller, cause the vehicle control apparatus to identify state information of the tailgate using the sensor device, determine whether a specified condition about loss of the state information is met when a command to open and close the tailgate is received through the input device, and control opening and closing of the tailgate, based on an estimated RPM identified based on at least one of an environmental condition, the training data, an amount of change in current data, an amount of change in RPM, or any combination thereof, when it is determined that the specified condition is met.

2. The vehicle control apparatus of claim 1, wherein the at least one instruction is configured to, when executed by the controller, cause the vehicle control apparatus to:

determine that the specified condition is met and that the state information is lost when identifying that a battery of the host vehicle is reconnected, determine that an operation of the controller is initialized or determine that the tailgate is kept open as a time limit is exceeded.

3. The vehicle control apparatus of claim 1, wherein the at least one instruction is configured to, when executed by the controller, cause the vehicle control apparatus to:

identify an opening degree of the tailgate using the state information when it is determined that the specified condition is not met;

identify a required RPM required to close the tailgate based on the current opening degree; and close the tailgate based on the required RPM.

4. The vehicle control apparatus of claim 1, wherein the at least one instruction is configured to, when executed by the controller, cause the vehicle control apparatus to:

identify the state information of the tailgate using a hall sensor included in the sensor device when the command to open and close the tailgate is received.

5. The vehicle control apparatus of claim 1, further comprising:

a tailgate driving device including at least one motor configured to open and close the tailgate, wherein the at least one instruction is configured to, when executed by the controller, cause the vehicle control apparatus to close the tailgate based on the estimated RPM using the tailgate driving device when it is determined that the specified condition is met.

6. The vehicle control apparatus of claim 1, wherein the at least one instruction is configured to, when executed by the controller, cause the vehicle control apparatus to:

drive the tailgate during a specified time based on a specified voltage when it is determined that the specified condition is met; and identify the estimated RPM based on the result of comparing the amount of change in current data and the amount of change in RPM during the specified time with the RPM and the current data included in the training data.

7. The vehicle control apparatus of claim 6, wherein the at least one instruction is configured to, when executed by the controller, cause the vehicle control apparatus to:

estimate real-time opening angle of the information tailgate based on the compared result; and close the tailgate based on the estimated RPM corresponding to the real-time opening angle information.

8. The vehicle control apparatus of claim 6, wherein the at least one instruction is configured to, when executed by the controller, cause the vehicle control apparatus to:

identify the environmental condition about an environment around the host vehicle using the sensor device; and compare specified data corresponding to the environmental condition among the training data with the amount of change in current data and the amount of change in RPM and identify a compared result.

9. The vehicle control apparatus of claim 6, wherein the at least one instruction is configured to, when executed by the controller, cause the vehicle control apparatus to:

drive the tailgate in the direction of closing the tailgate during the specified time based on the specified voltage when it is determined that the specified condition is met.

10. The vehicle control apparatus of claim 1, wherein the environmental condition includes at least one of temperature information of an area adjacent to the host vehicle, slope information of a road on which the host vehicle is located, or any combination thereof.

11. A vehicle control method, comprising:

identifying, by a controller, state information of a tailgate of a host vehicle using a sensor device;

determining, by the controller, whether a specified condition about loss of the state information is met when a command to open and close the tailgate is received through an input device; and controlling, by the controller, opening and closing of the tailgate, based on an estimated revolutions per minute (RPM) identified based on at least one of an environmental condition, training data stored in a memory, an amount of change in current data, an amount of change in RPM, or any combination thereof when it is determined that the specified condition is met.

12. The vehicle control method of claim 11, wherein determining whether the specified condition about the loss of the state information is met by the controller when the command to open and close the tailgate is received through the input device includes:

determining, by the controller, i) that the specified condition is met and that the state information is lost when identifying that a battery of the host vehicle is reconnected, ii) that an operation of the controller is initialized, or iii) that the tailgate is kept open as a time limit is exceeded.

13. The vehicle control method of claim 11, further comprising:

identifying, by the controller, an opening degree of the tailgate using the state information when it is determined that the specified condition is not met;

identifying, by the controller, a required RPM required to close the tailgate based on the current opening degree; and closing, by the controller, the tailgate based on the required RPM.

14. The vehicle control method of claim 11, wherein identifying the state information of the tailgate of the host vehicle by the controller, using the sensor device, includes:

identifying, by the controller, the state information of the tailgate using a hall sensor included in the sensor device when the command to open and close the tailgate is received.

15. The vehicle control method of claim 11, wherein:

the host vehicle further includes a tailgate driving device including at least one motor configured to open and close the tailgate, and the method further comprises closing the tailgate based on the estimated RPM using the tailgate driving device when it is determined that the specified condition is met.

16. The vehicle control method of claim 11, further comprising:

driving, by the controller, the tailgate during a specified time based on a specified voltage when it is determined that the specified condition is met; and identifying, by the controller, the estimated RPM based on the result of comparing the amount of change in current data and the amount of change in RPM during the specified time with the RPM and the current data included in the training data.

17. The vehicle control method of claim 16, further comprising:

estimating, by the controller, real-time opening angle information of the tailgate based on the compared result; and closing, by the controller, the tailgate based on the estimated RPM corresponding to the real-time opening angle information.

18. The vehicle control method of claim 16, further comprising:

identifying, by the controller, the environmental condition about an environment around the host vehicle, using the sensor device; and comparing, by the controller, specified data corresponding to the environmental condition among the training data with the amount of change in current data and the amount of change in RPM and identifying, by the controller, a compared result.

19. The vehicle control method of claim 16, further comprising:

driving the tailgate in the direction of closing the tailgate during the specified time based on the specified voltage when it is determined that the specified condition is met.

20. The vehicle control method of claim 11, wherein the environmental condition includes at least one of temperature information of an area adjacent to the host vehicle, slope information of a road on which the host vehicle is located, or any combination thereof.

* * * * *